United States Patent [19]
Del Rosso

[11] Patent Number: 5,736,696
[45] Date of Patent: Apr. 7, 1998

[54] COMBINED AUTOMOTIVE LIGHT SWITCH

[75] Inventor: Vittorio Del Rosso, Wollstein, Germany

[73] Assignee: Eaton Corporation, Cleveland, Ohio

[21] Appl. No.: 491,961

[22] PCT Filed: Jun. 6, 1994

[86] PCT No.: PCT/DE94/00640

§ 371 Date: May 9, 1996

§ 102(e) Date: May 9, 1996

[87] PCT Pub. No.: WO94/29890

PCT Pub. Date: Dec. 22, 1994

[30] Foreign Application Priority Data

Jun. 12, 1993 [DE] Germany .......................... 43 19 543.1

[51] Int. Cl.$^6$ .................................................. H01H 9/26
[52] U.S. Cl. ................................................... 200/5 R
[58] Field of Search .................... 200/5 R, 5 B, 200/5 C, 17 R, 18; 180/90; 362/61, 250, 251, 802

[56] References Cited

U.S. PATENT DOCUMENTS

| | | | |
|---|---|---|---|
| 4,403,818 | 9/1983 | Kleinböhl | 180/90 X |
| 4,868,354 | 9/1989 | Ray et al. | 200/17 R |
| 4,885,434 | 12/1989 | Vultaggio et al. | 200/4 |
| 5,442,527 | 8/1995 | Wichelt | 362/61 |
| 5,596,233 | 1/1997 | Leiber et al. | 307/9.1 |

FOREIGN PATENT DOCUMENTS

| | | |
|---|---|---|
| 3023905 A1 | 1/1982 | Germany . |
| 3031711 A1 | 4/1982 | Germany . |
| 4036671 A1 | 5/1992 | Germany . |

*Primary Examiner*—Edward Tso
*Attorney, Agent, or Firm*—Roger A. Johnston

[57] ABSTRACT

An automotive light switch assembly having a rotatable/pull-push type user actuator extending from a housing adapted for dashboard mounting. The rotary actuation controls the on/off functions for both the parking and headlamps and the pull-push actuation controls the on/off function for the vehicle interior lights. A light pipe illuminates, from a stationary source a translucent lens on the rotatable/pull-push actuator to facilitate user location. Stationary translucent lenses are illuminated to indicate the particular function position that has been selected. A pair of spaced oppositely disposed wheel or disc-type actuators are provided below the rotatable/pull-push actuator for controlling respectively headlamp illumination distance and interior light intensity. A light pipe illuminates, from a stationary lamp source, a translucent lens on each wheel to indicate the wheel position. Stationary illuminated indicators display the function/level selected by each individual wheel position. Separate user stationary lenses are illuminated to facilitate user location. A pair of push-push actuators are disposed between the wheels and serve to control off/on switching for the front and rear fog lamps. Each push-push actuator has a light pipe illuminating separate location and function lenses on the actuator. Spring clips on the housing retain the housing in the dashboard.

18 Claims, 5 Drawing Sheets

5,736,696

COMBINED AUTOMOTIVE LIGHT SWITCH

BACKGROUND OF THE INVENTION

The invention relates to an automotive light switch that includes a rotary/pull switch for the parking lights, headlights and interior lighting, said switch accommodated in a casing.

Switches of that type, for actuation of the parking and headlights by turning the actuating knob and for actuating the interior lighting lamps by pulling the knob are known in various styles (e.g., DE-A1-3 023 905, DE-A1-4 036 671, DE-A1-3 031 711). Such a switch is installed in the dashboard of an automobile as a preassembled module. In addition to this rotary/pull switch, an on/off switch for the fog light, an on/off switch for the fog taillight, a control switch for the illuminated distance and a control switch for the dashboard illumination need to be installed in the dashboard at different locations. This arrangement of the switches requires extra installation space for each individual switch and involves, fix each individual switch, extra installation expense. Furthermore, the switches are not all situated in the operator's line of sight, due to their spaced positioning within the dashboard, which impedes visually locating a specific switch.

Therefore, the problem underlying the invention is to provide an automotive light switch of the initially named type which, while serving all light switching functions of an automobile, has a maximally compact structure.

SUMMARY OF THE INVENTION

This problem is inventionally solved in that the casing accommodates additionally a control switch for the illuminated distance, an on/off switch for the fog light, an on/off switch for the fog taillight and a control switch for the dashboard illumination.

This arrangement results in a combined automotive light switch for all light switching functions of an automobile, which switch, preassembled, can be fitted easily and quickly in a opening in the dashboard of the automobile; that is, it is no longer necessary to install various individual switches for the different light switching functions. All that is required is installing the combined automotive light switch according to the invention. With all switches accommodated in a common casing, they form an extremely compact arrangement that requires relatively little installation space. Furthermore, all of the individual switches are now directly in the operator's line of sight, enabling the operator to quickly recognize the desired individual switch of the combined automotive light switch.

For easy installation of the automotive light switch, according to a favorable embodiment of the invention the casing snaps into an appropriate dashboard opening through the intermediary of opposed retaining springs.

To provide an operator-friendly handling of the automotive light switch, a favorable advancement of the invention provides for arranging side by side, below the rotary/pull switch, the control switch for the illuminated distance, the on/off switch for the fog light, the on/off switch for the fog taillight and the control switch for the dashboard illumination.

Preference goes to the opposed arrangement of the two control switches, with the on/off switches centered in between, side by side.

Each of the individual switches features a locating and a function illumination. According to a favorable advancement of the invention, the light sources for the locating and function illumination of the switches are arranged on a joint printed circuit board, and the light sources illuminate the opaque locating symbols and the opaque function symbols of the switches by way of light guides. An installation-friendly arrangement of the light sources is obtained, since these can be preassembled on the printed circuit board.

In the preferred practice of the invention, the printed circuit board rests on a base snapped in place in the casing and provided with plug contacts, the latter connecting to the printed circuit board by means of clamping devices. This guarantees a quick installation of the common printed circuit board for all switches.

A further preferred provision is arranging the light guide pertaining to the rotary/pull switch, rotationally fixed and axially loose, on a rotatable and axially movable shank of the rotary/pull switch. A simple and function-matched installation of the light guide is thus obtained. The light guide of the rotary/pull switch features a light emission point that is coordinated with the locating symbol in the actuating button and a light aperture which in contingence on the shank position is coordinated with a specific one of several function symbols in the casing, above the pertaining light source, in a flange having the shape of a circular segment and provided with a translucent coating. These measures guarantee a flawless illumination of the locating symbol and the specific function symbol, with a faint illumination of the remaining function symbols given at the same time.

In order to allow a reduction of the number of necessary light guides, another embodiment provides for a common light guide to simultaneously act upon the function and locating illumination of the control switches. A separate light guide is preferably provided for function illumination of the on/off switches.

For a function-matched light transmission, the common light guide features, according to another embodiment of the invention, two light guide rods extending up to the locating symbols arranged in the casing and, two light guide rods that protrude into the bottoms of the on/off switches, said rods corresponding to the light guide rods fitted in the on/off switches that are coordinated each with the locating symbol arranged in a push button of the respective on/off switch. The common light guide preferably possesses additionally two light emission rings that pertain to the illumination of the function for the control switches, with each light emission ring acting both on a function symbol inset in a selector wheel of the pertaining control switch and on at least one function symbol inset in the casing. The light guides for the function illumination of the on/off switches consist, each, of a light guide rod which is coordinated with the function symbol arranged in the push button of the relevant on/off switch.

To accomplish a reliable switching of the rotary/pull switch, an axially loose rotary switching member fitted with contacts and acting on plug contacts is one embodiment of the invention mounted on the shank of the rotary/pull switch, for different light switching positions, and the free end of the shank interacts with a contact lever for the interior lighting, which lever is one-sidedly mounted on the bottom of the base, spring-loaded and acts upon an electrical contact.

Preferably each on/off switch has a push button switch with a pivotable spring-loaded frame type switching member which is coordinated with a heart cam and carries a spring-loaded contact roll which acts upon electrical contacts. The advantage here is that the fog light and the fog taillight can be reliably switched using the push button switches. To facilitate the installation, the two on/off switches fashioned as push button switches are installed in the casing of the automotive light switch, preassembled as a unit in a common casing.

Preferably each control switch has an electrical switch with a resistor allowing adjustment by means of a wiper and provided on the printed circuit board to control the energy consumption of electrical loads for adjustment of the illuminated distance or the brightness of the dashboard illumination. Accurate switching of the illuminated distance and of the dashboard illumination is thus accomplished.

DETAILED DESCRIPTION

Figure 1:
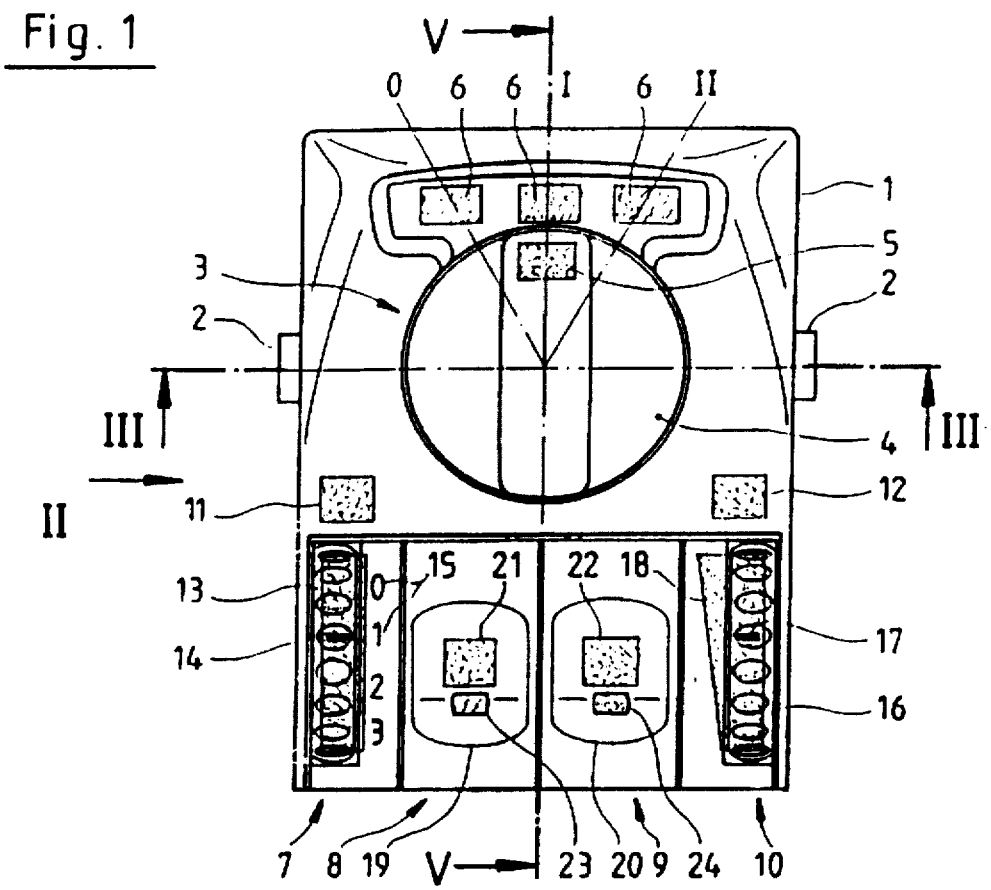
FIG. 1 shows a plan view of an automotive light switch.
Figure 2:
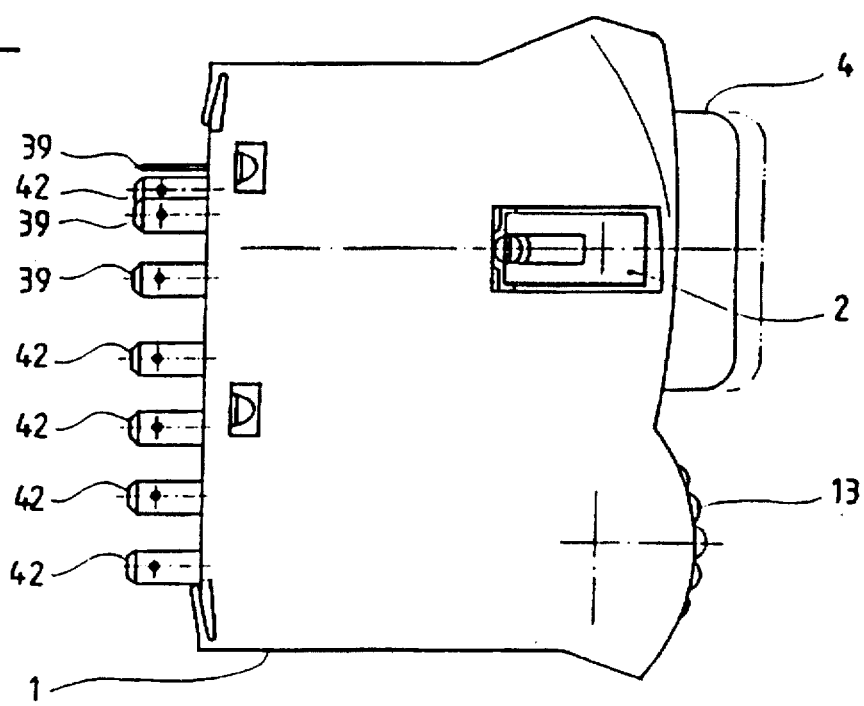
FIG. 2 a view of the illustration relative to FIG. 1, in the direction of arrow II.
Figure 3:
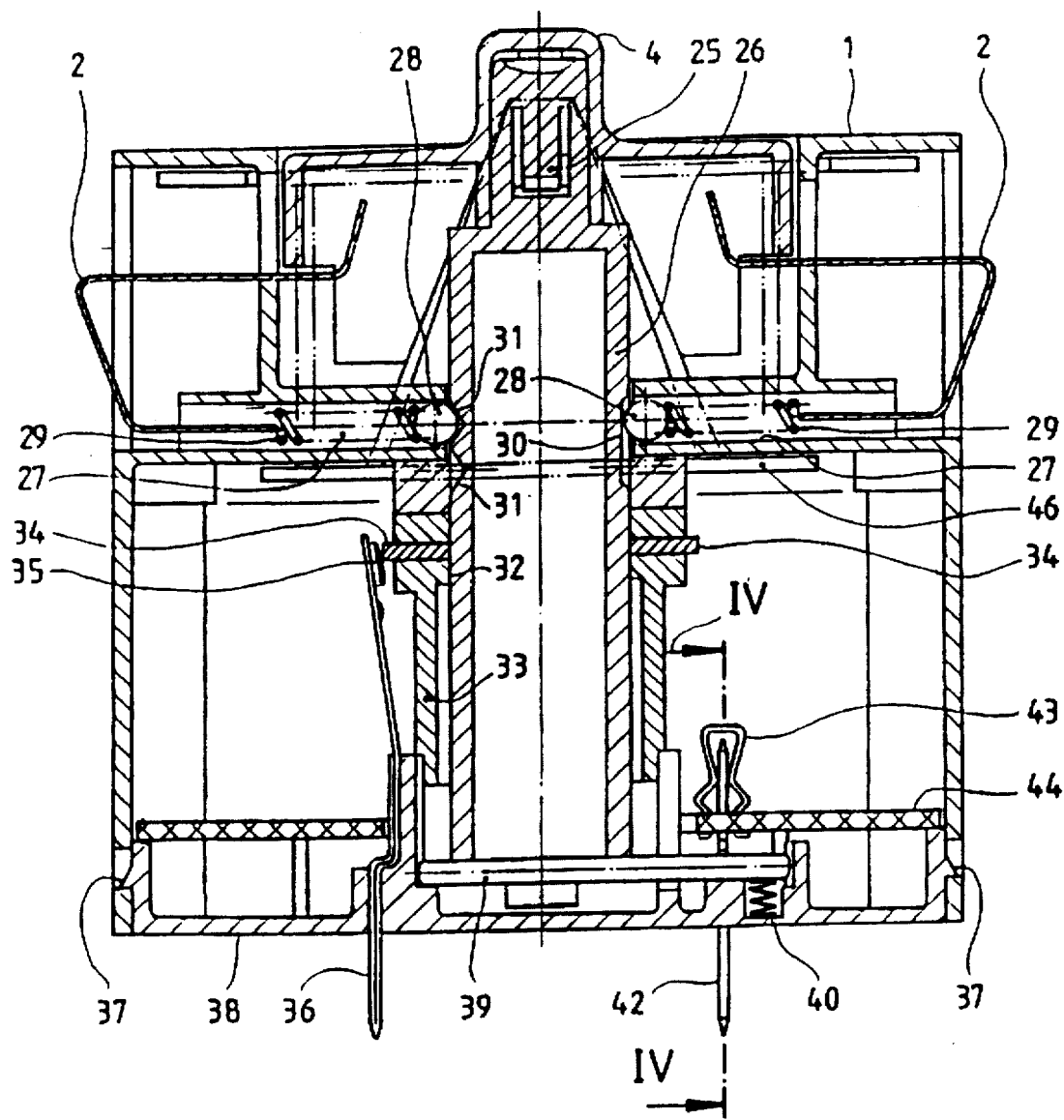
FIG. 3 a section through the automotive light switch according to FIG. 1 along line III—III, scaled up.
Figure 4:
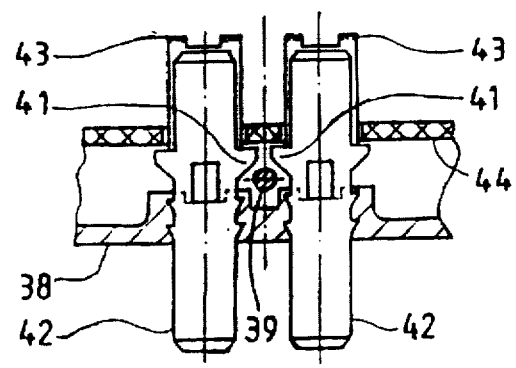
FIG. 4 a section through the illustration relative to FIG. 3 along line IV—IV.
Figure 5:
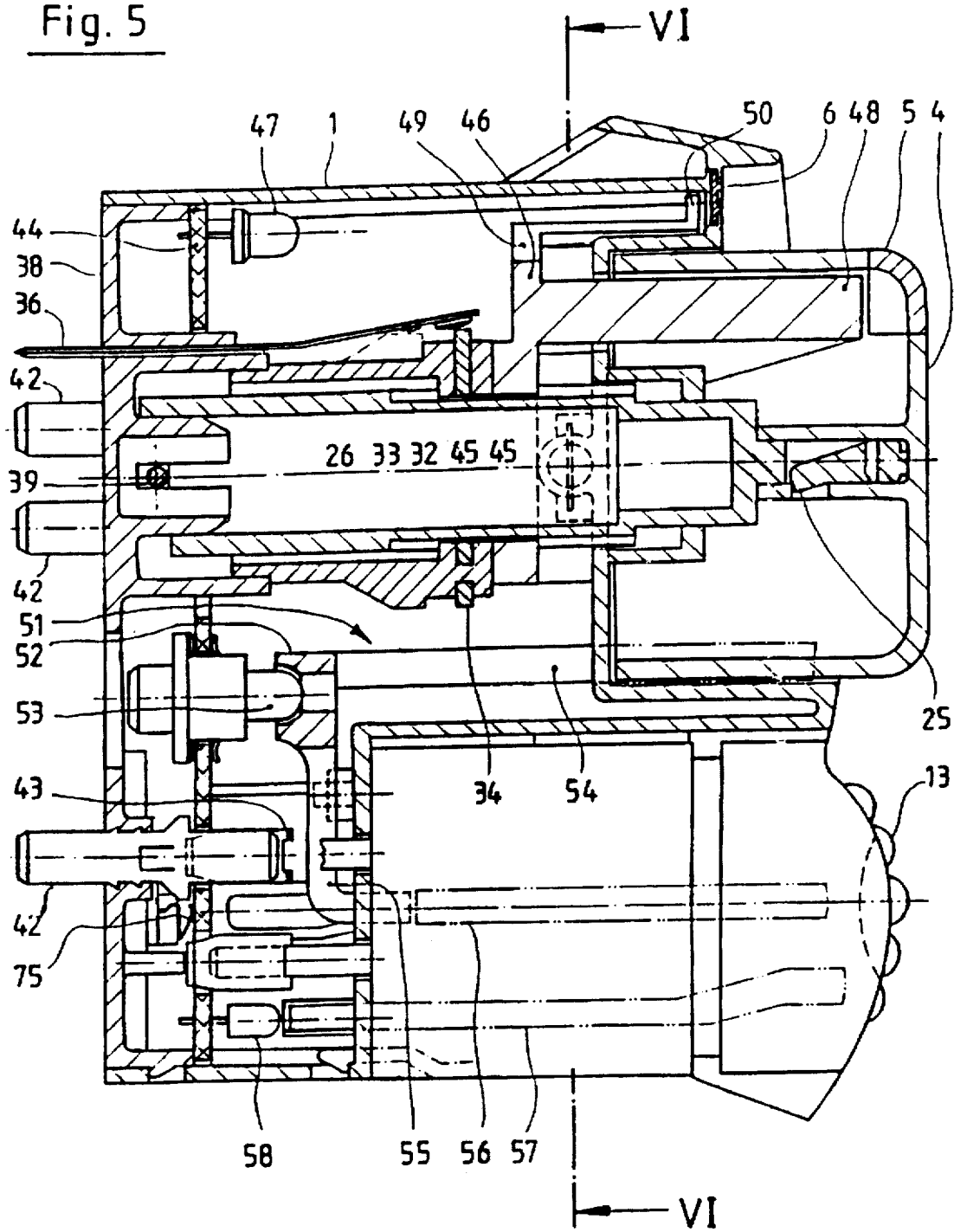
FIG. 5 a section through the automotive light switch according to FIG. 1, along line V—V, scaled up.
Figure 6:
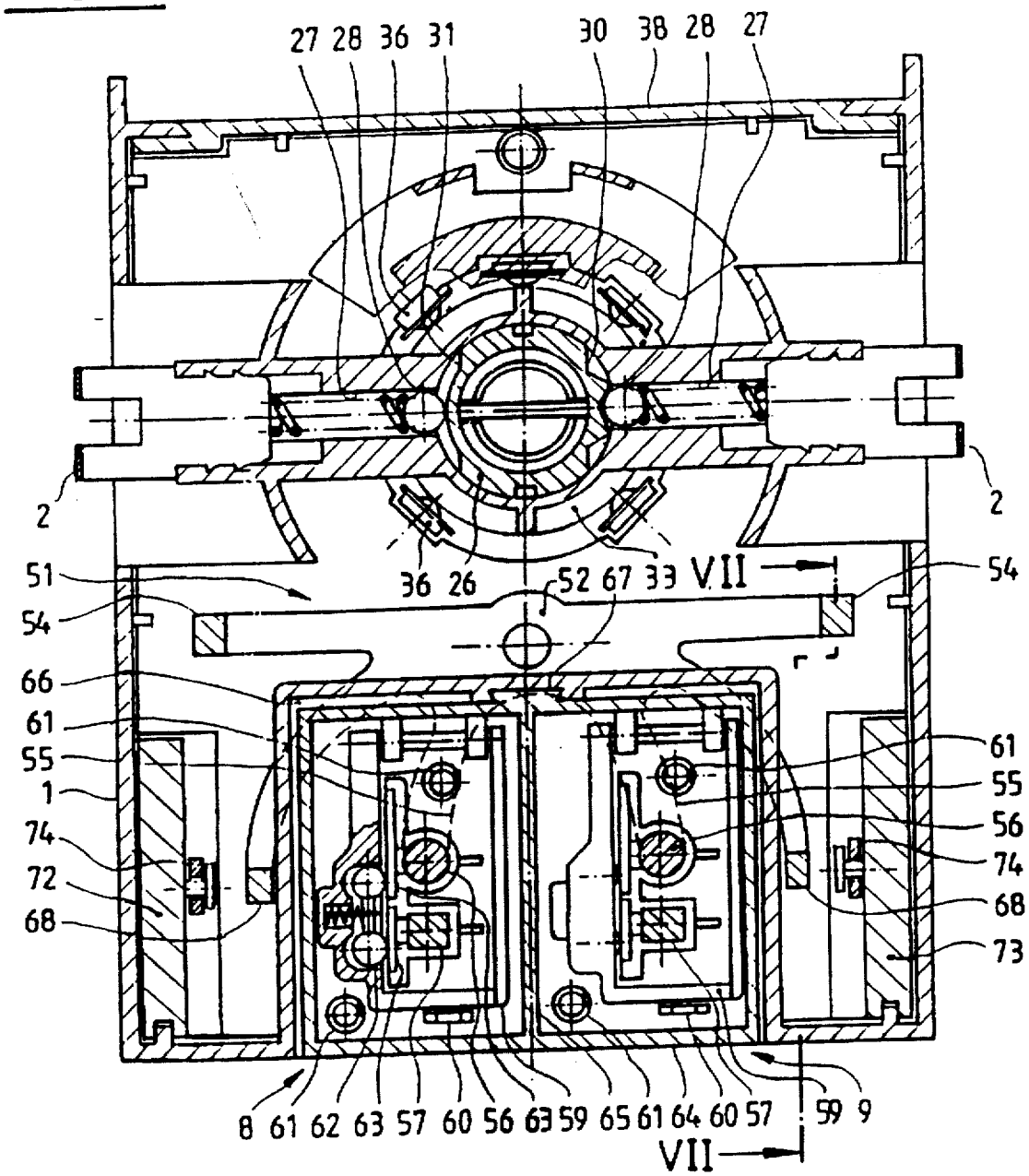
FIG. 6 a section through the illustration according to FIG. 5, along line VI—VI.
Figure 7:
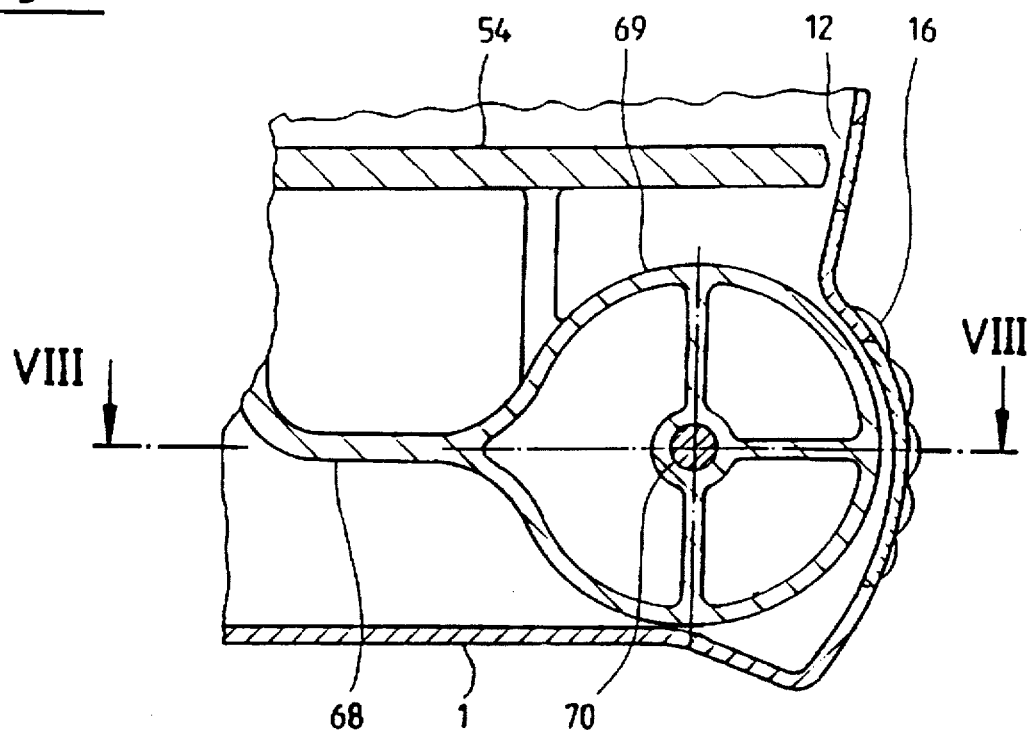
FIG. 7 a section through the illustration according to FIG. 6, along line VII—VII.
Figure 8:
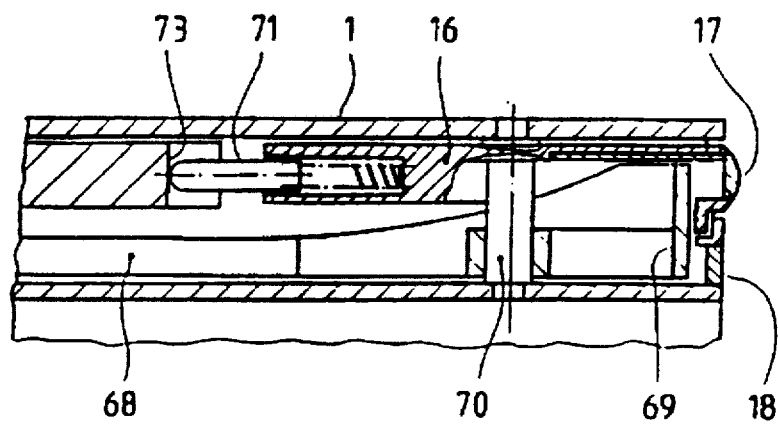
FIG. 8 a section through the illustration according to FIG. 7, along line VIII—VIII.

Referring to the drawings, in cross section, the automotive light switch has a rectangular housing or casing 1 which by means of protruding retaining springs 2 inserted in the casing on opposite sides is held in an appropriate opening in the dashboard of an automobile. The casing 1 accommodates in its upper area a rotary/pull switch 3 for actuation of the parking and headlights as well as the interior illumination. Adjustable in rotary and pull direction, the actuating knob 4 is provided with an opaque locating symbol 5 which is opposed by three adjacent opaque function symbols 6 which are arranged in the casing 1 and can be illuminated in accordance with the three rotary switching positions 0, I, II of the actuating knob 4. In switching position 0, the parking and headlights are turned off, while in switching position I the parking lights are turned on and in switching position II the headlights are turned on, with the corresponding function symbol 6 illuminated brightly.

Arranged below the rotary/pull switch 3 the casing 1, side by side, are a control switch 7 for adjusting the distance illuminated by the headlights, an on/off switch 8 for actuation of the fog lights, an on/off switch 9 for actuation of the fog taillight and a control switch 10 for adjusting the brightness of the dashboard illumination. Located above the two control switches 7, 10 in the casing 1 are opaque locating symbols 11., 12 that can be illuminated. The selector wheel 13 of the control switch 7 is fitted with an illuminable, opaque function symbol 14, which interacts with an illuminable opaque function symbol 15 arranged sideways next to the selector wheel 13 in the casing 1. Similarly, the selector wheel 16 of the control switch 10 possesses an illuminable opaque function symbol 17 that interacts with an illuminable opaque function symbol 18 arranged beside the selector wheel 16 in the casing 1. The on/off switches 8, 9 are fashioned as push button switches, and their push buttons 19, 20 contain each an illuminable opaque locating symbol 21, 22 and an illuminable opaque function symbol 23, 24.

The actuating knob 4 of the rotary/pull switch 3 is joined by way of a snap connection 25 to a shank or shaft 26 held in the casing 1 in rotationally and longitudinally movable fashion. The casing 1 features, below the actuating knob 4, diametrically opposed radial conduits 27, into each of which are fitted a ball-shaped catch 28 and a helical compression spring 29. One catch 28 on one side of shaft 26 interacts with axial slots 30, on another catch 28 interacts with radial slots 31 on the opposite side of shaft 26. Fixed in each of the conduits 27 is the end of a retaining spring 2; and, the end of the helical compression spring 29 opposite the catch 28 bears on the respective end of the relevant retaining spring 2. Fitted in the shank or shaft 26, via axial tongue-and-groove guides 32, is a rotary switching member 33 to which contacts 34 are molded which are fashioned as contact tabs, and which protrude in segmented fashion beyond the periphery of the rotary switching member 33, and whose outsides interact as contact tracks with contact bosses 35 of plug contacts 36.

Fitted in the casing 1 via snap connectors 37 is a base 38 through which extends at least one plug contact 36. Attached to the bottom of base 38 with its one side is a contact lever 39, which under the urging of a compression spring 40 fitted in the bottom of the base 38 bears on the underside of the shank 26 in its unpulled state. In this position of the shank 26, the contact lever 39 is contained in the free space beneath adjacent projections 41 of two additional, adjacent plug contacts 42, which by clamping devices 43 are joined to a printed circuit board 44. As the actuating knob 4, and with it the shank 26, is pulled to turn the interior lighting on, the shank releases the contact lever 39, allowing it to rest on the projections 41 of the plug contacts 42, and thereby closes appropriate circuits. Otherwise, the PC board 44 resting on the base 38 is coordinated with all of the individual switches and, is therefore, provided, by way of further clamping devices 43, with a corresponding number of plug contacts 42.

Fitted on the shank 26, above the rotary switching member 33 in rotationally fixed and axially moveable fashion via tongue-and-groove guides 45, is a light guide 46 to which pertains a light source 47 which is arranged on the PC board 44. The light guide 46 features a light guide point 48 that extends adjacent the locating symbol 5 in the actuating button 4. The bottom end of the light guide point 48 extends by way of a double angle 49 in a circular-segment flange 50 which, horizontally aligned extends closely adjacent the function symbols 6 in the casing 1. Contained below the flange 50 is a light source 47. Provided with a slightly translucent coating, the flange 50 has formed in its center a recessed light aperture so that, depending on the position of shank 26, the selected function symbol 6 beneath which the light aperture is located will be illuminated more so than the two other function symbols 6.

The casing 1, has additionally provided therein a common light guide 51 for the locating illumination of the control switches 7, 10, on/off switches 8, 9 and function illumination for the control switches 7, 10. The foot 52 of this light guide 51 is situated directly above a further light source 53 fitted in the PC board 44. Two light guide rods 54 extend from the foot 52 of the light guide 51 up to a position closely adjacent the locating symbols 11, 12 of the control switches 7, 10. Additionally, two light guide rods 55 originate from the foot 52 of the light guide 51; they protrude through the bottoms of the on/off switches 8, 9 into these. Arranged within each of on/off switches 8, 9 is a separate light guide rod 56 which is aligned on the free end of the light guide rod 55 of light guide 51 and, ends closely adjacent the locating symbol 21, 22 of the push button 19, 20 of the relevant on/off switch 8, 9. In addition to the light guide rod 56, a further light guide rod 57 is contained in each of the on/off switches 8, 9. The bottom end of said additional light guide rod is situated directly above a further light source 58, which is arranged on the printed circuit board 44 and whose upper end is situated closely adjacent the function symbol 23, 24 of the relevant push button 19, 20. The two light guide rods 56, 57 of each on/off switch 8, 9 extend through a pivotable spring-loaded frame type switching member 59 with which a heart cam 60 is coordinated and which interacts with the push button 19, 20 acted upon by compression springs 61. Fitted in the frame type switching member 59 is a spring-loaded roller contact 62 which, by way of coordinated contact tracks 63 and the PC board 44, connects to the plug contacts 42. The two on/off switches 8, 9 are housed in a common casing 64 which is divided into separate chambers by a partition 65; the casing fits into an appropriate recess 66 in the casing 1 via a dovetailing 67.

Additionally, the common light guide 51 features two light guide rods 68 which each have one end extending into a light emission ring 69 bearing on the axle pin of the selector wheel 13, 16 of the relevant control switch 7, 10. The light emission rings 69 are provided with a knurled surface and have extending the end thereof closely adjacent the periphery of the selector wheels 13, 16 with the inset function symbols 14, 17 and the function symbols 15, 18 inset in the casing 1. Each selector wheel 13, 16 features a spring-loaded catch 71 that interacts with a pertaining track 72, 73 molded to the base 38. Additionally, each of the selector wheels 13, 16 is by way of a pivotable lever 74 coupled to a wiper 75 which acts upon a (not shown) resistor provided on the underside of the PC board 44, which wiper and resistor controls the energy consumption of the electrical load for adjustment of the illuminated distance or brightness of the dashboard illumination is.

Although the invention has been hereinabove described with respect to the illustrated embodiments, it will be understood that the invention may be practiced in other forms; and, accordingly is bounded by the following claims.

I claim:

1. An automotive light switch assembly with a rotary/pull switch (3) accommodated in a casing (1), for the parking lights, headlights and the interior lighting, characterized in that the casing (1) accommodates additionally a rotary actuated control switch (7) for the illuminated distance, a push actuated on/off switch (8) for the fog light, a push actuated on/off switch (9) for the fog taillight, and a rotary actuated control switch (10) for the dashboard illumination; wherein the rotary actuated switches are each rotatable about an axis at generally right angles to the axis of rotation of said rotary/pull switch.

2. Automotive light switch according to claim 1, characterized in that the casing (1) includes opposed retaining springs and is adapted to be snap-mounted in an appropriate opening in the dashboard of the automobile.

3. Automotive light switch according to claim 1, characterized in that there are arranged, below the rotary/pull switch (3), side by side, the control switch (7) for the illuminated distance, the on/off switch (8) for the fog light, the on/off switch (9) for the fog taillight, and the control switch (10) for the dashboard illumination.

4. Automotive light switch according to claim 1, characterized in that the two control switches (7, 10) are provided opposite the on/off switches (8, 9) juxtaposed in center position.

5. Automotive light switch according to claim 1, characterized in that a locating and a function illumination are coordinated with each of the switches (7, 8, 9, 10).

6. Automotive light switch according to claim 1, characterized in that the light sources (47, 53, 58) for the locating and function illumination of the switches (7, 8, 9, 10) are arranged on a common printed circuit board (44), and in that the light sources (47, 53, 58) act by way of light guides (46, 51, 57) upon the opaque locating symbols (5, 11, 12, 21, 22) and the opaque function symbols (6, 14, 15, 17, 18, 23, 24) of the switches (3, 7, 8, 9, 10).

7. Automotive light switch according to claim 1, characterized in that the printed circuit board (44) rests on a base (38) which is snap-mounted in the casing (1) and provided with plug contacts (36, 42), the plug contacts (42) connecting through clamping devices (43) to the printed circuit board (44).

8. Automotive light switch according to claim 1, characterized in that the light guide (46) pertaining to the rotary/pull switch (30) is arranged in rotationally fixed and axially loose fashion on a rotatable and axially movable shank (26) of the rotary/pull switch (3).

9. Automotive light switch according to claim 1, characterized in that the light guide (46) of the rotary/pull switch (3) possesses a light emission point (48) coordinated with the locating symbol (5) in the actuating knob (4) and a light aperture which dependent on the position of the shank (26) is coordinated with a specific one of several function symbols (6) in the casing (1), above the pertaining light source (47) in a circular-segment flange (50) provided with a slightly translucent coating.

10. Automotive light switch according to claim 1, characterized in that for the locating illumination of the control switches (7, 10) and of the on/off switches (8, 9) there is a common light guide (51) provided which at the same time acts upon the function and locating illumination of the control switches (7, 10).

11. Automotive light switch according to claim 1, characterized in that a separate light guide (57) is provided for each of the function illuminations of the on/off switches (8, 9).

12. Automotive light switch according to claim 1, characterized in that the common light guide (51) features, or one, two light guide rods (54) that extend up to the locating symbols (11, 12) arranged in the casing (1) and, for another, two light guide rods (55) that protrude into the bottoms of the on/off switches (8, 9) and correspond with the light guide rods (56) fitted in the on/off switches (8, 9), which light guide rods (56) are coordinated each with the locating symbol (21, 22) arranged in a push button (19, 20) of the relevant on/off switch (8, 9).

13. Automotive light switch according to claim 1, characterized in that the common light guide (51) features two light emission rings (69) that are coordinated with the function illumination of the control switches (7, 10), with each light emission ring (69) acting both on a function symbol (14, 17) inset in a selector wheel (13, 16) of the pertaining control switch (7, 10) and upon at least one function symbol (15, 18) inset in the casing (1).

14. Automotive light switch according to claim 1, characterized in that the light guides for the function illumination of the on/off switches (8, 9) consist each of a light guide rod (57) which is coordinated with the function symbol (23, 24) arranged in the push button (19, 20) of the respective on/off switch (8, 9).

15. Automotive light switch according to claim 1, characterized in that an axially loose rotary switching member

(33) serving various light switching positions and acting upon plug contacts (36) while featuring contacts (34) is mounted on the shank (26) of the rotary/pull switch (3), and in that the free end of the shank (26) interacts with a contact lever (39) for the interior lighting, said lever being one-sidedly attached to the bottom of the base (38), spring-loaded and acting upon plug contacts (42).

16. Automotive light switch according to claim 1, characterized in that each of the on/off switches (8, 9) is fashioned as a push button switch with a pivotable, spring-loaded frame type switching member (59) with which a heart cam (60) is coordinated and which supports a spring-loaded contact roll (62) which acts upon plug contacts (42).

17. Automotive light switch according to claim 1, characterized in that the two on/off switches (8, 9) are fitted in the casing (1) of the automotive light switch as a unit preassembled in a common casing (64).

18. Automotive light switch according to claim 1, characterized in that each of the control switches (7, 10) is an electrical switch with a resistor that is adjustable by a wiper (75) and applied on the printed circuit board (44), to control the energy consumption of electrical loads for adjustment of the illuminated distance or brightness of the dashboard illumination.

* * * * *